Feb. 5, 1963  W. L. ACKER  3,076,245
AUTOMATIC CHUCKING DEVICE FOR DRILL PIPE
Filed May 16, 1960  2 Sheets-Sheet 1

INVENTOR
WILLIAM L. ACKER,
BY Beale & Jones
ATTORNEYS

Feb. 5, 1963  W. L. ACKER  3,076,245
AUTOMATIC CHUCKING DEVICE FOR DRILL PIPE
Filed May 16, 1960  2 Sheets-Sheet 2

INVENTOR
WILLIAM L. ACKER, JR

BY Beale & Jones

ATTORNEYS

United States Patent Office 3,076,245
Patented Feb. 5, 1963

3,076,245
AUTOMATIC CHUCKING DEVICE FOR
DRILL PIPE
William L. Acker, Scranton, Pa., assignor to Acker Drill
Company, Inc., Scranton, Pa., a corporation of Pennsylvania
Filed May 16, 1960, Ser. No. 29,403
8 Claims. (Cl. 24—263)

This invention relates to improvements in rotary chucking devices and particularly for drill pipes and the like wherein positively biased, radially gripping jaws grip the drill pipe and a controlled force applying mechanism is provided to release the jaw grip to permit the drill pipe to be axially moved therethrough.

It is an object of the invention to provide a top and a bottom set of wedge type gripping jaws positively biased to move along a cam surface of a body to supply high radial gripping forces to a drill pipe carried axially within the body with the body rotatably mounted and provided with controlled force applying means for releasing the jaws.

Another object of the invention is to provide in a chucking device for drill pipes and the like a positively biased wedge type of grippers wherein the weight of the drill pipe tends to add to the gripping force of the top set of gripping jaws while the force on the drill as its reaction force in drilling acts upwardly and tends to add to the positive setting force to move the bottom set of wedged shaped jaws upwardly on their cam surfaces and thence radially inwardly into drill pipe gripping engagement.

A further object of the invention is to provide in a drill pipe engaging chuck assembly a set of positive pressure applying top springs and a set of bottom springs each acting on an annular pressure applying plate which distributes forces to inclined wedges attached to the pressure applying plates and moving along cam surfaces in a rotary mounted body so as to move the jaws radially and inwardly into drill pipe gripping engagement while said gripping jaws are carried in the rotary mounted body.

Still further objects and the entire scope of applicability of the present invention will become apparent from the detailed description given hereinafter. It should be understood, however, that the detailed description and specific example is given by way of illustration only and, while indicating a preferred embodiment of the invention, is not given by way of limitation, since various changes and modifications within the spirit and scope of the invention will become apparent to those skilled in the art from this detailed description.

Reference is made to the drawings in which—

Throughout the description like reference numbers refer to similar parts.

Figure 1:
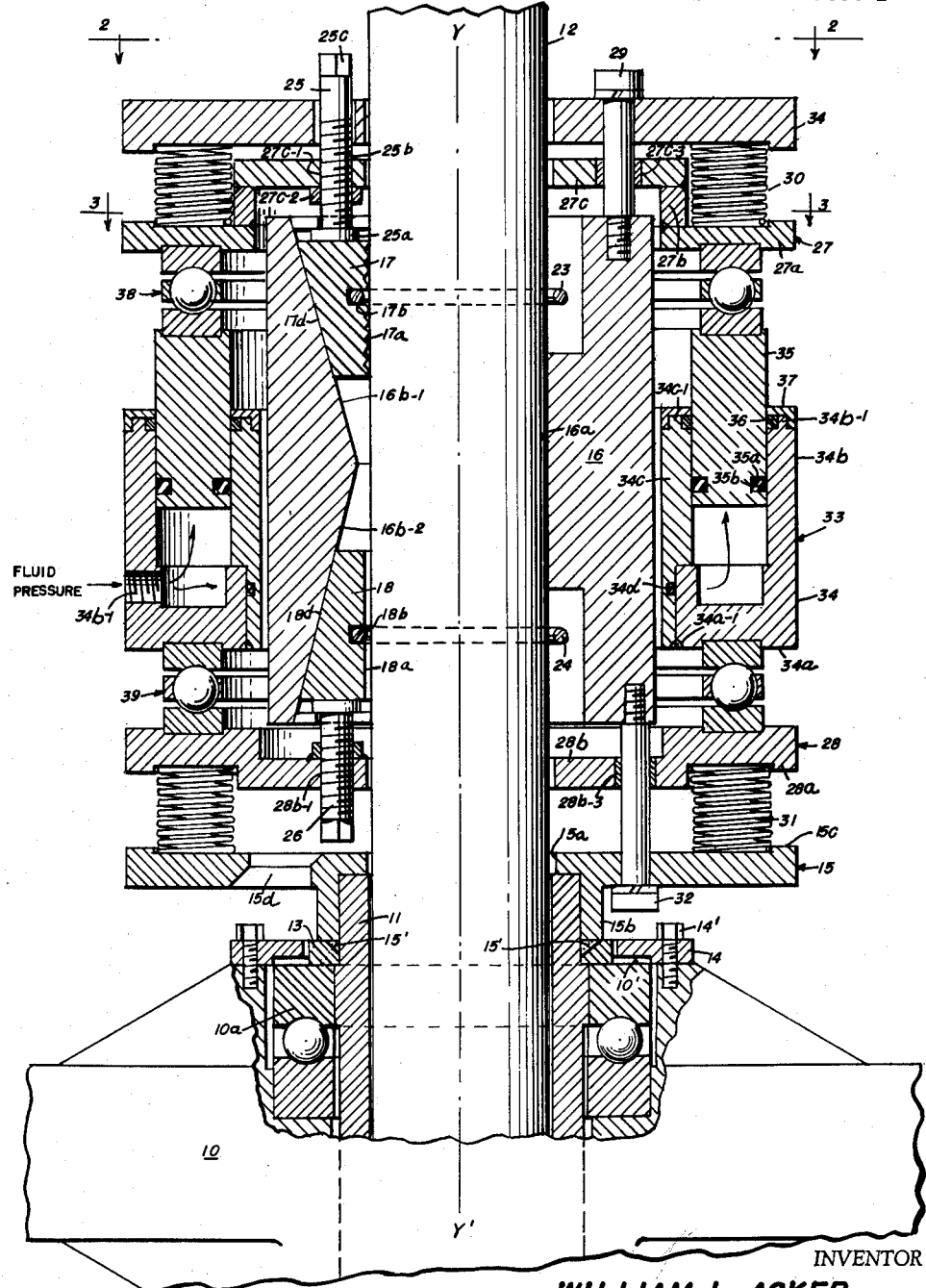
FIG. 1 is a fragmentary cross sectional view of the chuck.
Figure 2:
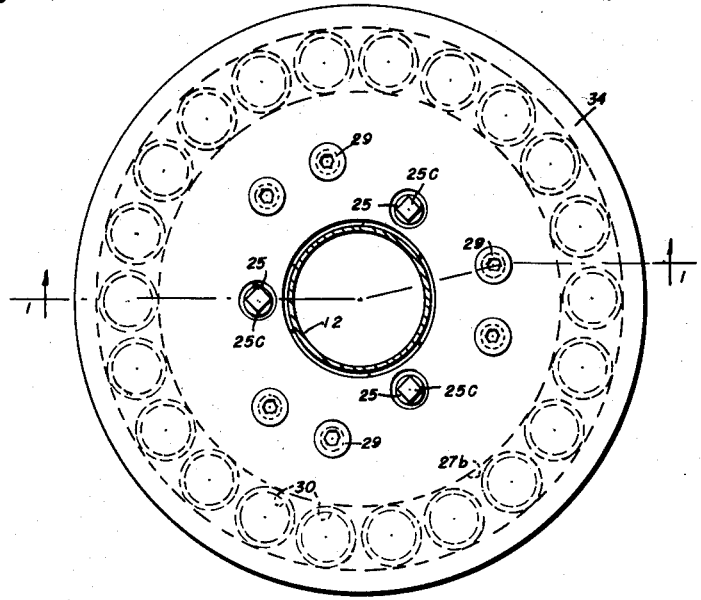
FIG. 2 is a top plan view of the chuck along line 2—2 of FIG. 1.

A cross head of a drill rig is generally indicated at 10 having a vertically extending central aperture therethrough about the axis Y—Y' which receives the drill spindle 11 and within which extends a drill pipe 12. The spindle extends up, a relatively short distance, as shown in FIG. 1, above the cross head 10. The cross head 10 is recessed to receive the thrust bearing 10a on which is received an annular thrust transmitting spacer 13. Surrounding the spacer 13 is a cross head cover 14 that is held down on the cross head 10 by cap screws 14'.

Next above the spindle 11 is a specially formed circular shaped bottom plate member 15 having a central aperture 15a received over the top of the spindle 11 and a depending outwardly spaced depending circular collar portion 15b that surrounds the upstanding spindle portion 11. The foot of the collar 15b is welded at 15' to the spindle 11. The top of bottom plate 15 at its outer portion is formed with a slight upstanding annular shoulder portion 15c which acts as a retainer for the bottom set of compression springs to be described. Access apertures such as 15d extend through the plate to permit a shaped wrench to be inserted to adjust the lower wedges as will be described.

Figure 4:
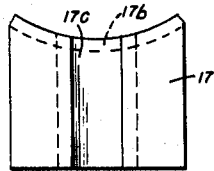
FIG. 4 is a top plan view of one of the top jaws shown in FIG. 1 but on an enlarged scale.

A body member is indicated generally at 16 and is fabricated from a generally cylindrical piece of stock. It is provided with an axially extending central aperture 16a through which extends the drill rod 12. Axially in 120° spaced apart position in body member 16 extend three jaw receiving recesses 16b, 16c and 16d having outwardly sloping cam surfaces from the center, such as 16b-1 at the top and 16b-2 at the bottom for recess 16b. In the cam recess 16b shown in FIG. 1 there is received adjacent the cam surface 16b-1 a top wedge shaped movable jaw 17, see FIG. 4, and in sliding engagement with the cam surface 16b-2 a lower wedge shaped jaw 18, see FIGURES 5 and 6. The top and bottom jaws of jaw receiving recess 16c are 19 and 20, respectively, and the top and bottom jaws of recess 16d are 21 and 22, respectively.

Figure 5:
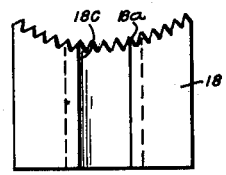
FIG. 5 is a bottom plan view on an enlarged scale of one of the bottom jaws shown in FIG. 1.
Figure 3:
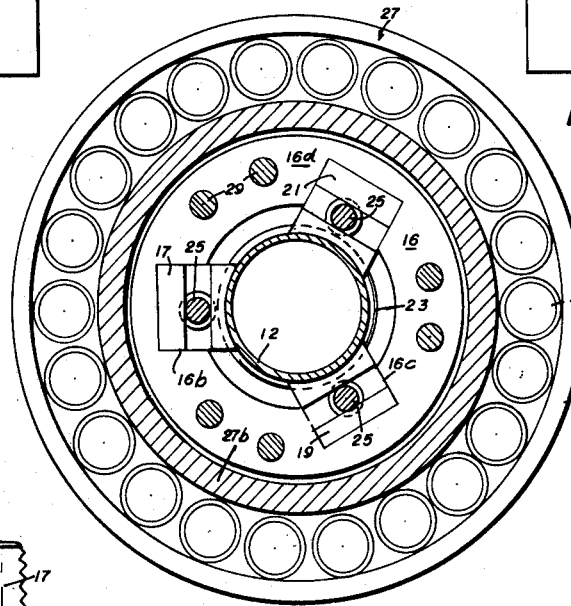
FIG. 3 is a sectional view of the chuck along line 3—3 of FIG. 1.
Figure 6:
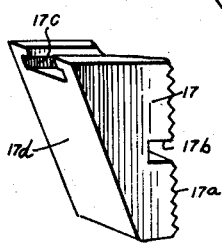
FIG. 6 is an isometric on an enlarged scale of one of the top jaw members shown in FIG. 1.

Reference to FIG. 6 shows top jaw 17 in perspective and it is slightly shorter than its respective bottom jaw 18, see FIG. 1. The top jaw 17 has serrations 17a extending horizontally in its drill pipe gripping face and also in the face is a horizontally disposed and radially inwardly extending spring retainer slot 17b. In the top of the jaw member 17 there is formed a bolt or screw head receiving slot 17c of a somewhat T-shape in cross section. The cam surface engaging back side is indicated at 17d for jaw 17. In FIG. 5 there is shown a bottom plan view of the bottom jaw 18 having vertically extending pipe gripping serrations 18a and a bolt receiving slot 18c.

In FIG. 1 there is shown an upper annular spring member 23 received within the slot 17b of jaw 17 and likewise the slots in the other top jaws 19 and 21 to urge or bias them radially outwardly in seating engagement with their respective cam surfaces such as 16b-1 for slotway 16b. Also in FIG. 1 is shown a bottom annular spring member 24 for likewise holding radially outwardly the lower group of jaws 18, 20 and 22.

The top jaws receive in their slotways such as 17c for jaw 17 the head of a special screw 25 having a head 25a, threads 25b and a wrench receiving portion 25c. Similar but somewhat slightly shorter screws are shown at 28 for the bottom jaws.

There is a top annular pressure plate 27 and a bottom annular pressure plate 28. Top pressure plate is made up of an annular outer spring seat portion 27a, a vertically disposed spacer 27b and an annular screw receiving portion 27c. The screw receiving portion is provided with tapped apertures 27c-1 and welded threaded reinforcements 27c-2 to receive the screws 25 and the like. A set of spaced apart through apertures are shown at 27c-3 to receive top stripper bolts 29 as will be explained.

The bottom annular pressure plate 28 is made with an outer annular spring receiving portion 28a having formed in the bottom a recess to receive the tops of a set of bottom compression springs 31 whose bottom ends rest against the top of the bottom plate 15 therebelow.

There is an inner annular slightly vertically offset portion 28b forming the bottom pressure plate 28 and portion 28b has reinforced threaded apertures 28b–1 therein to receive the bottom screws 26 mounting the bottom jaws 18, 20 and 22. Also in the bottom pressure plate portion 28b are spaced through apertures 28b–3 to receive therethrough bottom stripper bolts 32.

A top annular plate is indicated at 34 and it has apertures to receive the stripper bolts 29 that hold the top plate against the top of each of the top set of compression springs 30. The top plate has access apertures spaced therein to permit the screws 25 to extend therethrough. The top stripper screws 29 are received in threaded apertures formed in the top of body member 16. Likewise the bottom stripper bolts 32 are threadedly received in suitable threaded recesses in the bottom face of the body member 16.

Pressure is applied to the top and bottom pressure plates 27 and 28 by having suitably placed therebetween spaced apart telescopic power members generally indicated at 33. This telescopic power member here illustrated comprises a cylinder 34 and a power piston 35. The cylinder 34 is specially formed with an annular bottom end 34a and outer wall 34b and an inner anular wall 34c sealed by an O-ring 34d and welded to the bottom portion 34a as at 34a–1. The top of the annular outer wall 34b and inner wall 34c are formed with upstanding bosses 34b–1 and 34c–1 to receive a felt seal 36 and an outer cap seal 37.

The piston 35 has an O-ring recess 35a formed therein to receive a sealing O-ring 35b. The bottom of the cylinder portion 34a and the top of the annular piston member 35 have slight recesses therein to receive one race member of an antifriction bearing assembly generally indicated at 38 for the top and 39 for the bottom. Power from the power member 33 and from the top set of springs 30 and the lower set of springs 31 is evenly distributed in the top pressure plate 27 and the bottom pressure plate 28 so that when pressure is released or slacked off of the force applying member 33 the two sets of springs act through their cooperating jaws to grip the drill pipe or drill rod as the case may be. A positive bias is thus afforded to grip the drill pipe 12.

In the application of the weight of the drill pipe 12 to the top jaws 17, 19 and 21 there is a tendency to cause the jaws to be forced even more into gripping action as they are moved axially along their cam surfaces and urged radially inward. When the drill bit in the bottom end of the drill pipe is working pressure reaction upward in the drill pipe also tends to further set the lower jaws in addition to the action of the lower set of springs 31.

In the structure of the power applying member 33 there is formed in the outer wall 34b of the cylinder 34 a tapped aperture 34b–1 to receive a suitable fluid pressure connecting conduit (not shown).

There has been here provided a highly useful chuck assembly for a drill pipe wherein a positive spring pressed adequate downward force moves the top set of jaws axially and radially into gripping position and at the same time an upward spring pressed adequate upward force urges the bottom set of jaws upward on their cam surfaces and these jaws also move into a positive gripping position against a drill pipe. In the assembly controlled fluid pressure is applied through the telescopic power means to act against both the top and bottom sets of springs through annular and uniform pressure distributing plates to simultaneously release the top and bottom sets of drill pipe gripping jaws. A relatively highly compact chuck assembly is provided for handling a drill pipe or rod in a drill rig.

I claim as my invention:

1. A chucking device for drill pipe and the like comprising, in combination, a chuck body having a drill pipe receiving aperture and axis therethrough, said body having spaced apart jaw receiving axially extending passageways therethrough and in open communication with said drill pipe receiving aperture and having upper and lower cam faces extending from adjacent the center lengthwise portion of the passageway to the outer ends of the passageways where their distance from the axis through the body is greatest, an upper and a lower wedge shaped jaw in each passageway and each jaw presenting a face for gripping a drill pipe received in said drill receiving aperture of the body, said wedge shaped jaws having a cam surface thereon slidably engaging the adjacent cam face in the passageway, a top pressure plate having mounting means for suspending therefrom said upper jaws for movement along the adjacent cam surface and radially with respect to said suspending means, a lower pressure plate having mounting means from which is supported said lower jaws for movement along the adjacent cam surface and radially with respect to said supporting means, a top plate spaced above said top pressure plate and secured to said chuck body, a plurality of top compression springs extending axially and disposed between said top plate and said pressure plate whereby the pressure plate is biased downward along with said top jaws which slide against their cam surfaces and are urged radially inward to grip said drill pipe, a bottom plate spaced below said bottom pressure plate and secured to said chuck body, a plurality of bottom compression springs extending axially and disposed between said bottom plate and said pressure plate whereby the bottom pressure plate is biased upwardly along with said supported bottom jaws which slide against their cam surfaces and are urged radially inward to grip said drill pipe, top and bottom jaw retaining means holding said jaws in sliding engagement with their respective cam faces in their passageways, a top race of antifriction thrust bearings mounted against the lower face of said top pressure plate and generally in axial alignment with said top compression springs, a bottom race of antifriction thrust bearings mounted against the top face of said bottom pressure plate and generally in axial alignment with said bottom compression springs, a plurality of spaced apart and reciprocable power operated means disposed axially between said top and bottom antifriction thrust bearing races whereby said reciprocable means may be extended to force said pressure plates against their respective compression springs to move said top and bottom jaws opposite to their biased position whereby the jaws move along their cam faces and radially outward from their grip against said drill pipe, said bottom plate having mounting means adapted to attach it to the top of a cross head of a drill.

2. A chucking device for drill pipe according to claim 1 wherein said means for suspending said jaws from the top pressure plate and said means for supporting said jaws from the bottom pressure plate are screw means permitting relative axial adjustment of said jaws with respect to their respective pressure plate means.

3. A chucking device for drill pipe according to claim 1 wherein said jaws have a radially inwardly extending recess in their pipe engaging face that lies in a plane extending transverse to said axis through said body and wherein said means holding said jaws in engagement with their respective cam faces comprise an annular spring received within said radially extending recesses in said jaws.

4. A chucking device for drill pipe and the like according to claim 1 wherein said reciprocating power means comprises a hydraulic cylinder and ram positioned between said top and bottom antifriction thrust bearing races and whereby fluid pressure applied to said cylinder moves the top and bottom pressure plates from their biased condition towards each other to a position away from each other to release the grip of said jaws.

5. A chucking device for drill pipe and the like comprising, in combination, a chuck body having a drill pipe receiving aperture and axis therethrough, said body having spaced apart jaw receiving means extending axially therethrough and in open communication with said drill pipe receiving aperture and having upper and lower cam faces extending from adjacent the center lengthwise portion of the jaw receiving means to the outer ends of the jaw receiving means where their distance from the axis through the body is greatest, an upper and a lower wedge shaped jaw movable in each jaw receiving means and each jaw presenting a face for gripping a drill pipe received in said drill receiving aperture of the body, said wedge shaped jaws having a cam surface thereon slidably engaging the adjacent cam face in the passageway, a top pressure plate having mounting means for suspending therefrom said upper jaws for movement along the adjacent cam surface and radially with respect to said suspending means, a lower pressure plate having mounting means from which is supported said lower jaws for movement along the adjacent cam face in the passageway and radially with respect to said supporting means, a top plate spaced above said top pressure plate and having means securing it to said chuck body, a plurality of top compression springs extending axially and disposed between said top plate and said pressure plate whereby the pressure plate is biased downward along with said top jaws which slide against their cam faces and are urged radially inward to grip said drill pipe, a bottom plate spaced below said bottom pressure plate and having means securing it to said chuck body, a plurality of bottom compression springs extending axially and disposed between said bottom plate and said pressure plate whereby the bottom pressure plate is biased upwardly along with said supported bottom jaws which slide against their cam surfaces and are urged radially inward to grip said drill pipe, top and bottom jaw retaining means holding said jaws in sliding engagement with their respective cam faces, antifriction thrust bearing means mounted against the lower face of said top pressure plate and generally in axial alignment with said top compression springs, antifriction thrust bearing means mounted against the top face of said bottom pressure plate and generally in axial alignment with said bottom compression springs, a plurality of spaced apart and reciprocable power operated means disposed axially between said top and bottom thrust bearing means whereby said reciprocable means may be extended to force said pressure plates against their respective compression springs to move said top and bottom jaws opposite to their biased position whereby the jaws move along their cam faces and radially outward from their grip against said drill pipe, said bottom plate having mounting means adapted to attach it to the top of a cross head of a drill.

6. A chucking device for drill pipe according to claim 5 wherein said means for suspending said jaws from the top pressure plate and said means for supporting said jaws from the bottom pressure plate are screw means permitting relative axial adjustment of said jaws with respect to their respective pressure plate means and slide means permitting relative radial adjustment of said jaws.

7. A chucking device for drill pipe according to claim 5 wherein said jaws have a radially inwardly extending recess in their pipe engaging face that lies in a plane extending transverse to said axis through said body and wherein said means holding said jaws in engagement with their respective cam faces comprise an annular spring received within said radially extending recesses in said jaws.

8. A chucking device for drill pipe and the like according to claim 5 wherein said reciprocating power means comprises a hydraulic cylinder and ram positioned between said top and bottom antifriction thrust bearing means and whereby fluid pressure applied to said cylinder moves the top and bottom pressure plates from their biased condition towards each other to a position away from each other to release the grip of said jaws.

References Cited in the file of this patent

UNITED STATES PATENTS

| | | |
|---|---|---|
| 531,715 | Brown | Jan. 1, 1895 |
| 1,620,382 | O'Bannon | Mar. 8, 1927 |
| 1,725,666 | Morrow | Aug. 20, 1929 |
| 1,812,721 | Sheldon | June 30, 1931 |
| 1,828,938 | O'Bannon | Oct. 27, 1931 |
| 1,848,500 | Standlee | Mar. 8, 1932 |
| 1,853,856 | Gattrell | Apr. 12, 1932 |
| 1,872,105 | Black | Aug. 16, 1932 |
| 2,126,933 | Stone et al. | Aug. 16, 1938 |
| 2,830,788 | Bentley et al. | Apr. 15, 1958 |
| 2,858,105 | Lucas | Oct. 28, 1958 |
| 2,905,998 | Acker | Sept. 29, 1959 |
| 2,939,197 | Leven | June 7, 1960 |
| 2,969,648 | Rechtin | Jan. 31, 1961 |